Aug. 14, 1923.
T. C. HOLLNAGEL
DUMPING VEHICLE
Filed March 7, 1921
1,464,935
2 Sheets-Sheet 1
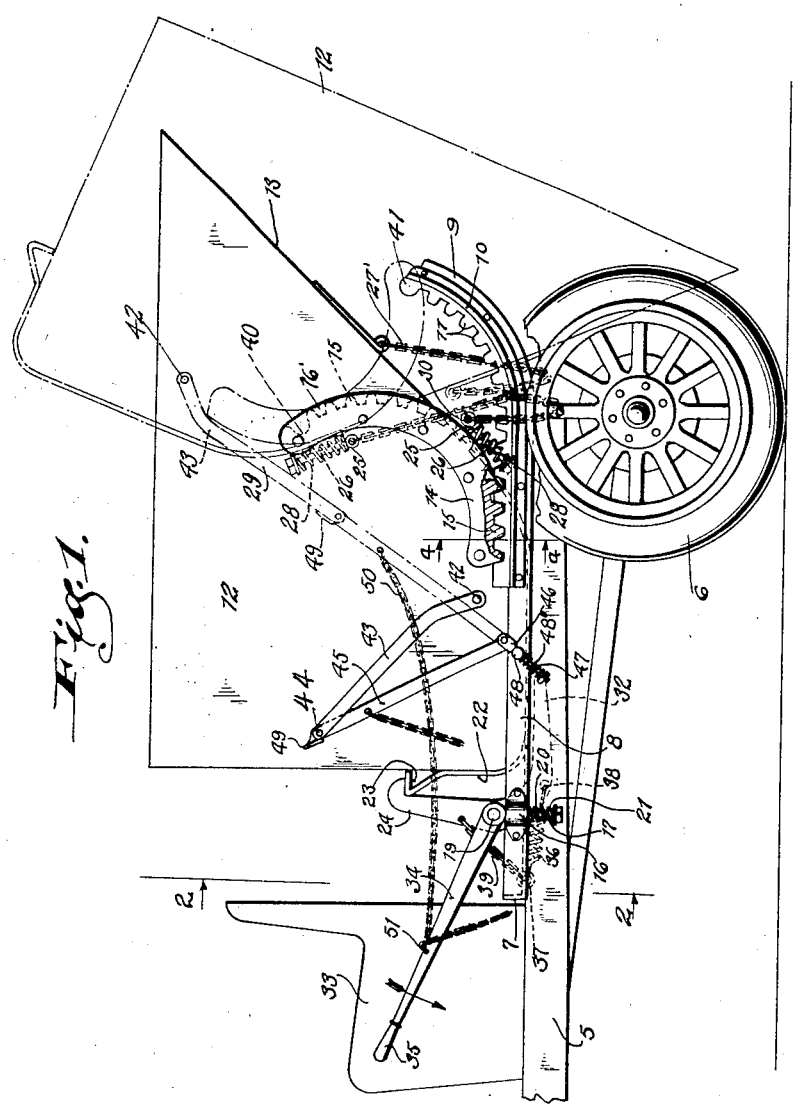
Theodore C. Hollnagel
INVENTOR.
BY
Ira M. Jones
ATTORNEY.

Aug. 14, 1923.
T. C. HOLLNAGEL
1,464,935
DUMPING VEHICLE
Filed March 7, 1921 2 Sheets-Sheet 2
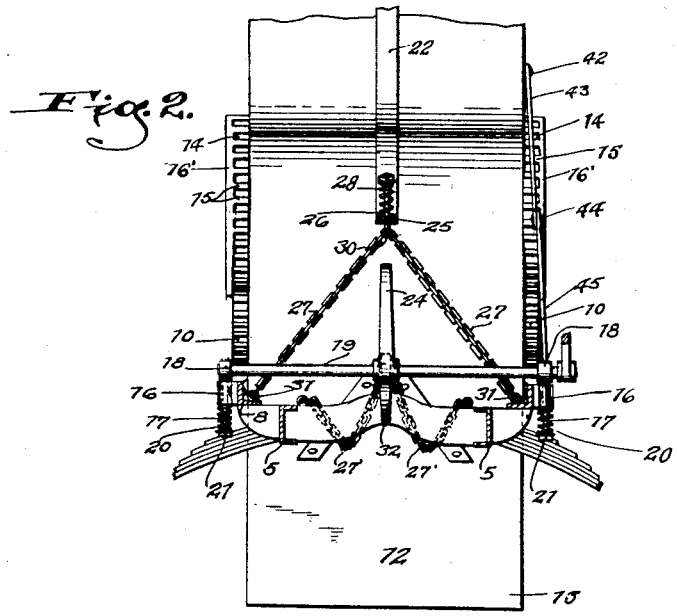
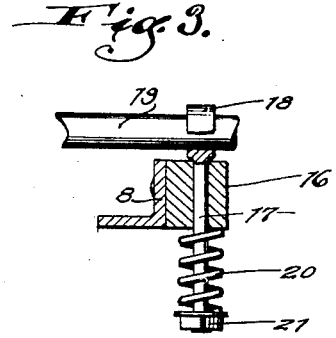
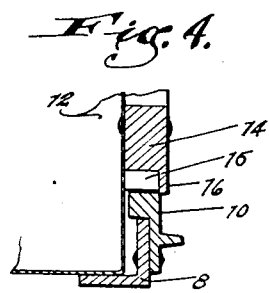
Theodore C. Hollnagel.
INVENTOR.
BY
Ira M. Jones
ATTORNEY.

Patented Aug. 14, 1923.

1,464,935

UNITED STATES PATENT OFFICE.

THEODORE C. HOLLNAGEL, OF MILWAUKEE, WISCONSIN.

DUMPING VEHICLE.

Application filed March 7, 1921. Serial No. 450,350.

*To all whom it may concern:*

Be it known that I, THEODORE C. HOLL-NAGEL, a citizen of the United States, and resident of Milwaukee, in the county of Milwaukee and State of Wisconsin, have invented new and useful Improvements in Dumping Vehicles, of which the following is a description, reference being had to the accompanying drawings, which are a part of this specification.

This invention relates to certain new and useful improvements in dumping vehicles and refers more particularly to a device of this class equipped with a hopper or load receiving body more especially designed for use in connection with road building.

The present design of the trucks or vehicles of this class is open to many serious objections, one of which is that the load receiving body in dumping is abruptly stopped when reaching discharging position severely jarring the entire truck chassis. As a result of this severe jarring received by the truck chassis whenever the body is dumped, the life of the machine is materially shortened.

Hence with the above and other objections to the existing types of devices of the class described, my invention has for one of its objects to provide means whereby the abrupt and sudden stopping of the body upon receiving its discharging position is eliminated.

Another objection to the existing types of devices of this class, is that after being dumped the body must be manually returned to normal position. This invention has for another of its objects to provide a device of the class described in which the body automatically returns to normal position upon its contents being discharged.

A further object of this invention is to provide means operable to retain the body in its discharging position even after its contents have been discharged, or operable to permit the ready return of the body as before stated.

A still further object of this invention is to provide means for releasably locking the load receiving body in normal position and adapted, upon being moved to unlocking position to give the body an initial start past the center of gravity whereby the same will continue its movement due to the arrangement of its own weight.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of the rear portion of a truck or vehicle embodying my invention, parts thereof being broken away and in section;

Figure 2 is a fragmentary view illustrating the load receiving body as in its dumping position, said view being taken on the plane of line 2—2 of Figure 1;

Figure 3 is a fragmentary detailed view, part in section and part in elevation, illustrating the improved bearing construction carrying the latch or body locking means;

Figure 4 is a fragmentary sectional view taken through Figure 1 on the line 4—4.

Referring now more particularly to the accompanying drawings in which like numerals designate like parts throughout the several views:

The numeral 5 designates the side beams of the truck chassis which is preferably supported by wheels 6. Secured to the chassis frame by any desired means, not shown, is a substantially U shaped frame 7, the sides 8 of which rest upon the chassis side beams 5 and have their outer free ends 9 extended slightly beyond the chassis frame and curved outwardly.

The sides 8 each have a rack bar 10 secured thereto having gear teeth 11 on its top face, the rack bars having their outer portions curved to conform with the curvature of the outer ends of the frame sides 8. Carried by the vehicle is a load receiving body 12 which preferably has its outer end wall 13 inclined inwardly and downwardly so that the same forms the bottom of the body when in its dumping or discharging position depicted by dotted lines in Figure 1.

Secured to each side wall of the body 12 is a segmental gear 14, or arcuate gear rack, the teeth 15 of which mesh with the adjacent gear racks 10 to provide a shifting pivotal connection between the body and chassis frame. When the body 12 is in its normal position, the innermost teeth of the racks 14 will be in mesh with the innermost teeth of the rack bars 10. The outer side of each gear 14 is provided with a flange 16' which prevents lateral or sidewise movement of the body 12. The gears 14 are so positioned on the body 12 as to have the same positioned either slightly beyond the center of gravity or else substantially at dead center when in normal position so that upon receiving an initial boost or lift the same will rock on its gears 14 and move to its dumping position illustrated by dotted lines in Figure 1. In view of this, I provide means for releasably locking the body in normal position and adapted upon movement to unlocking position to give the body the necessary initial lift.

The side members 8 have secured thereto, near their inner ends, two vertically disposed bearing members 16 in each of which is slidably mounted a rod 17 having a bearing 18 formed on its upper end. The bore of the bearings 18 are axially aligned and have the ends of the shaft 19 journaled therein. The bearing members 18 are normally yieldably urged to their lowermost limit of movement by springs 20 coiled about the rods 17 and confined between the bearings 16 and heads 21 fixed to the rods. Secured to the bottom of the body 12 is a longitudinally extending strip 22, one end of which projects upwardly against the inner end of the body and is then directed upwardly and outwardly and then abruptly inwardly to provide a keeper 23 which is engageable by a latch member 24 medially fixed to the shaft 19.

The outer end of the strip 22 extends a short distance along the rear wall 13 of the body 12 and is then struck laterally, as at 25, to provide a flange through which a fastening bolt 26, for chains 27, is slidably mounted. The bolt 26 has a spring 28 coiled therearound and confined between its end 29 and the flange 25, and the upper ends of the chains 27 are secured to the end 30 of said bolt and the lower ends thereof are secured as at 31 to the vehicle chassis. The chains 27 prevent the passing of the body beyond a certain point when dumping, the spring 28 easing or preventing the abrupt stopping thereof.

The latch member 24 forms one arm of a bell crank lever, the other end or arm 32 of which engages the bottom of the body just as the latch member disengages the keeper 23 so that a continuous rotation of the rod 19 will raise the inner end of the body until the same rolls or rotates by gravity to its dumping position. The shaft 19 is operated from the driver's seat 33 in any desired manner, the present improvement illustrating a lever 34 having its inner end made fast to the shaft 19 and its outer free end 35 positioned within reach of the driver. The latch member 24 is normally yieldably urged to its position depicted in Figure 1 by a spring 36 one end 37 of which is made fast to the frame 7 and the other end 38 of which is secured to the bell crank lever. The movement of the latch member, under action of spring 36, is limited by a chain 39. With this construction, as the body is returned to its normal position the keeper 23 forces the latch member 24 against the action of spring 36 to permit the same to spring over said keeper.

As the lever 34 is moved in the direction of the arrow in Figure 1, the latch member disengages the keeper and the arm 32 gives the body an initial lift when the same will roll or turn on its gears 14 and by reason of its momentum will be elevated by reason of the curvature of the rack bars 10. When the end recesses 40 of the gears 14 engage the large end teeth 41 of the rack bars 10, the body member pivots as illustrated by dotted lines in Figure 1. With the body in this position, the load is discharged therefrom and due to the majority of the weight being inwardly of the pivots 41, the body tends to return at once to normal position. To readily releasably retain the body in its dumping position, I provide the means now about to be described.

Pivotally secured to one side of the body, as at 42 is a lever 43, the inner end of which is pivotally connected as at 44 to a link member 45, the other end of which is pivotally connected with the head 46 of a rod 47 which is slidably mounted in a member 48 carried by the adjacent side member 8. The stem 47 is yieldably urged downwardly by a spring 48' confined between the member 48 and the lower end of the rod. The link member 45 has a flange or struck over portion 49 on its inner end which abuts the adjacent portion of the link 43 when the body is in dumping position to prevent its return. The link 45 has one end of a chain 50 secured thereto, the other end of which is secured to a crank fixed to the shaft 19 or to the lever 34, as at 51, so that a movement of the lever in the direction of the arrow will move the joints of the links 43 and 45 and permit the ready return of the body 12.

After the body 12 is permitted to return to its normal position by gravity, the latch member 24 engages over keeper 23, as hereinbefore described, and chains 27' prevent the jumping up of the outer end of the body 12 due to the sudden arresting of its movement. The side edges of the body bottom rest on the sides 8 when the body is in normal position, as illustrated in Figure 4. As the vehicle travels over a road-way the surface of which is uneven, the springs 20 of shaft 19 will yield in the event of any tendency of the body 12 to move upwardly due to the striking of a rough spot in the road-way. This construction prevents excessive wear on the parts as well as serves to absorb some of the shocks imparted thereto.

What I claim as my invention is:

1. In a device of the character described, a supporting frame, a tiltable load receiving body mounted on the frame and movable by gravity to a dumping position, and track means whereby said body is bodily elevated as it is moved toward dumping position.

2. In a device of the character described, a supporting frame, a track mounted on the frame, a substantial part of one end portion of said track being curved upwardly, and a load receiving body mounted on said track and rockable thereover to a dumping position.

3. In a device of the class described, a supporting frame, a pair of tracks mounted on the frame, a load receiving body and a pair of arcuate members carried by the body and engaging said frame carried tracks to permit movement of the body to and from a dumping position, the outer ends of said tracks being curved upwardly and said arcuate members riding thereon as the body approaches dumping position, whereby the body is elevated as it is moved to dumping position.

4. In a device of the class described, a supporting frame, a pair of substantially horizontal track members mounted on the frame and having their outer end portions curved upwardly, a load receiving body, a pair of arcuate members carried one by each side of the body and engaging the track members to permit movement of the body to and from a dumping position, said arcuate members each having a recess in their periphery near the outer end thereof, and a pivot carried by the outer end of each track member and engageable in the recesses of said arcuate members to pivot the body when in dumping position.

5. In a device of the class described, a supporting frame, a load receiving body carried by the frame and movable to and from a load discharging position, and latch means for readily releasably securing the body in normal position, said latch means including a bearing member capable of upward movement under stress, a shaft journalled in said bearing member, a latch member mounted on said shaft and engageable with a part carried by the body and means for actuating the latch member.

6. In a device of the class described, a supporting frame, a load receiving body carried by the frame and movable to and from a load discharging position, and latch means for readily releasably securing the body in normal position, said latch means including a bearing member capable of upward movement under stress, a shaft journalled in said bearing member, a latch member mounted on said shaft and engageable with a keeper carried by the body, means yieldably urging the latch member to its keeper engaging position and means for moving the latch member against the action of its urging means.

7. In a device of the class described, a supporting frame including a pair of spaced side members, a pair of substantially horizontal track members mounted on the side members and having their outer end portions curved upwardly, a load receiving body, and a pair of arcuate members carried one by each side of the body and engaging the track members to permit movement of the body to and from a dumping position, the bottom of the body engaging the side members when in normal position and the body being elevated and supported entirely by the curved portions of the track members when in dumping position.

In testimony whereof, I affix my signature.

THEODORE C. HOLLNAGEL.